Dec. 31, 1929.  K. E. LYMAN  1,741,864
AUTOMATIC TRANSMISSION
Filed Aug. 9, 1928  3 Sheets-Sheet 1

INVENTOR.
Kenneth E. Lyman
BY
ATTORNEY.

Dec. 31, 1929.　　　　K. E. LYMAN　　　　1,741,864
AUTOMATIC TRANSMISSION
Filed Aug. 9, 1928　　　3 Sheets-Sheet 2

INVENTOR.
Kenneth E. Lyman
BY
ATTY.

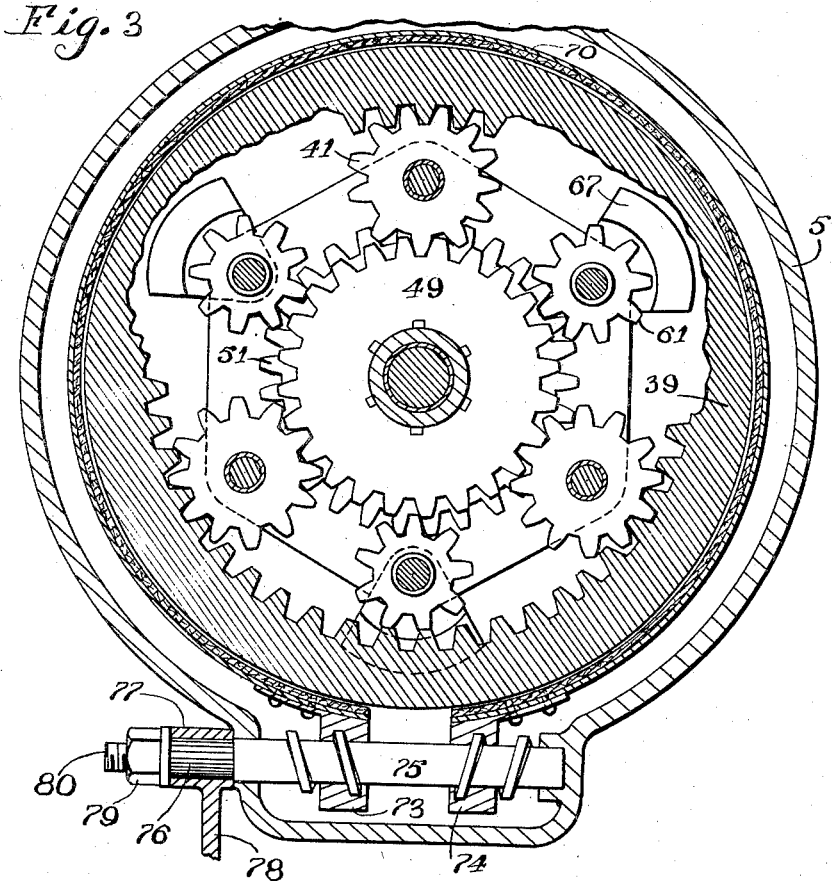
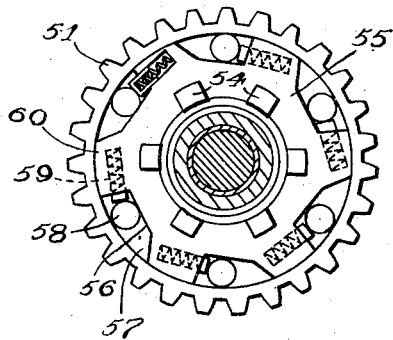
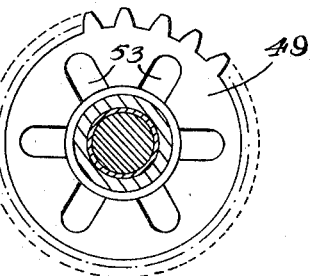

Patented Dec. 31, 1929

1,741,864

UNITED STATES PATENT OFFICE

KENNETH E. LYMAN, OF ROCKFORD, ILLINOIS, ASSIGNOR TO AUTOMATIC TRANSMISSION COMPANY, OF ROCKFORD, ILLINOIS, A CORPORATION OF ILLINOIS

AUTOMATIC TRANSMISSION

Application filed August 9, 1928. Serial No. 298,453.

The present invention relates in general to power transmitting mechanisms and has particular reference to an improved automatic transmission which is especially adaptable for us in connection with motor driven vehicles.

The primary object of the present invention is to provide an automatic control, of the centrigual responsive type, for planetary change speed mechanisms and to utilize this type of control in a cooperative relationship of parts which will, for all practical purposes eliminate the effective inherent inertia forces resulting from the operation of such a type of control and without materially sacrificing the effectiveness of the inherent centrifugal forces resulting from the operation thereof.

While the foregoing explains briefly the nature of the invention, other objects and advantages not herein specifically referred to will be readily appreciated upon a full comprehension of the novel features presented in the construction, arrangement and manner of operation of the transmission.

In order that the invention may be readily understood an embodiment of the same is set forth in the accompanying drawings and in the following detailed description.

It is understood that those skilled in the art may make various changes in the construction and arrangement of the parts without departing from the spirit and scope of the invention as defined in the subjoined claims, and I therefore do not wish to be restricted to the precise construction contained herein.

In the drawings:

Figure 3 is a view in section on the line 3—3, Figure 1 looking in the direction of the arrows.

Figure 1:
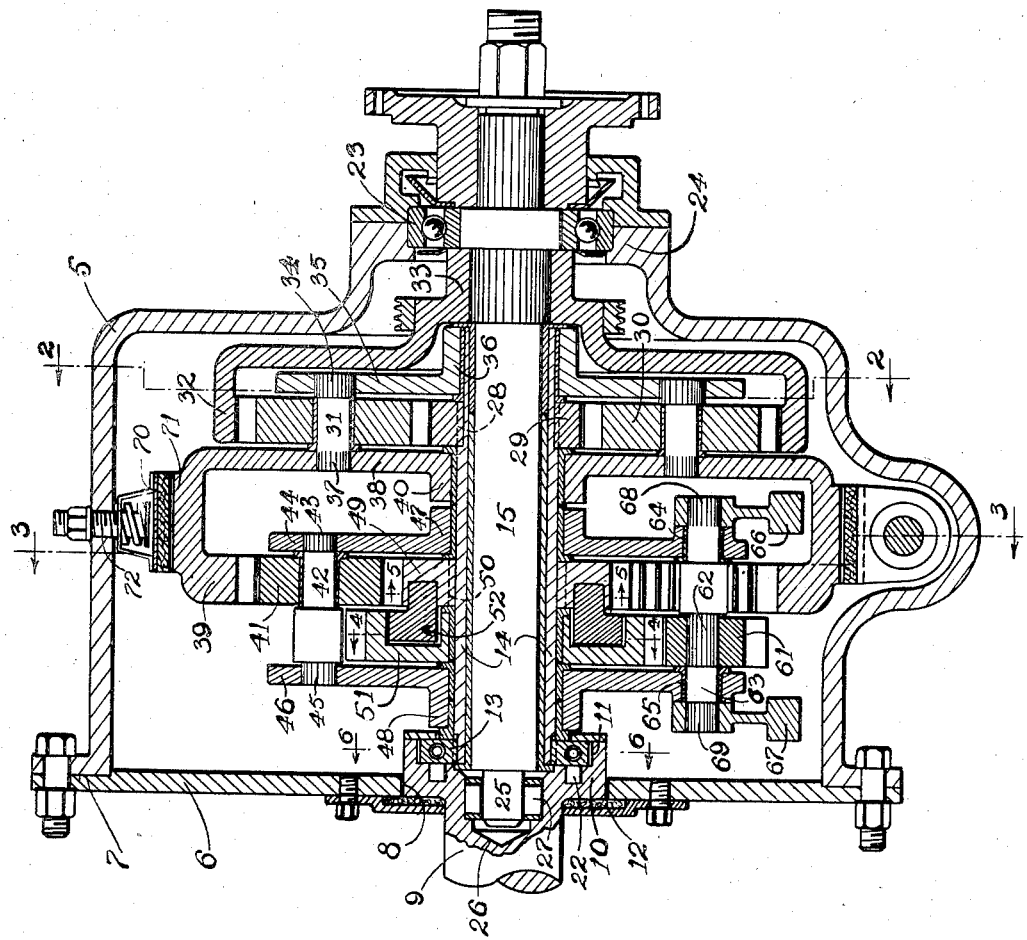
Figure 1 is a view in vertical section of a mechanism constructed in accordance with the preferred embodiment of the invention.
Figure 2:
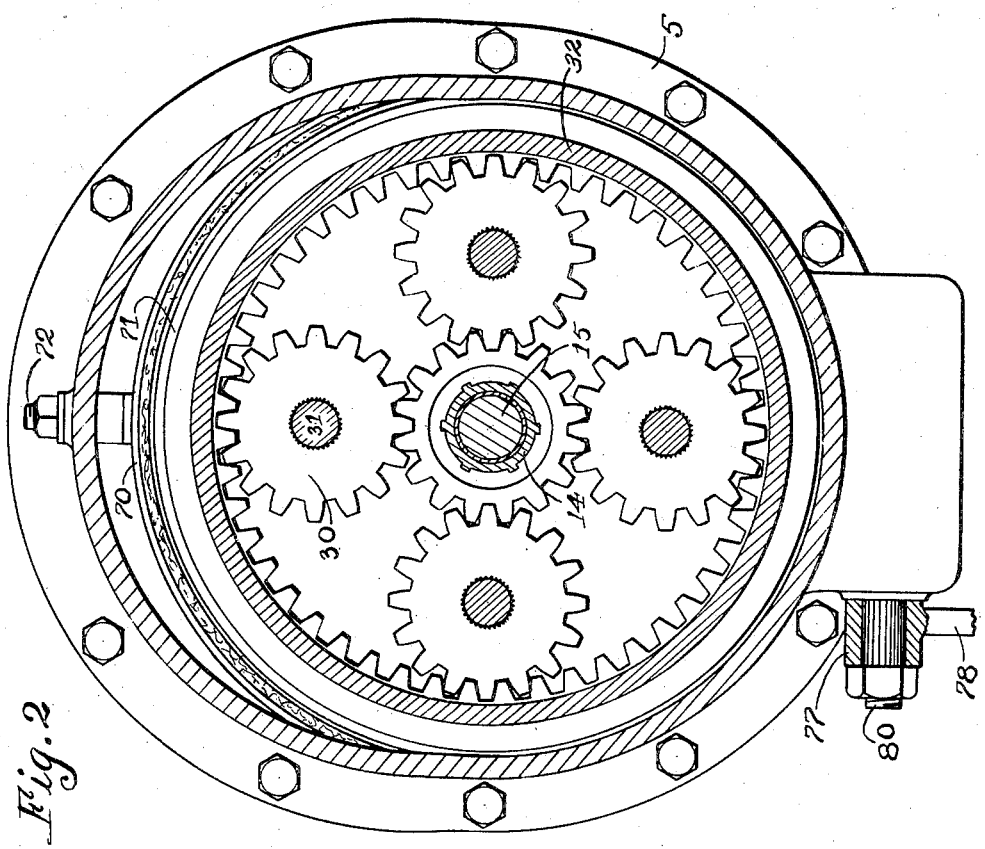
Figure 2 is a view in section on the line 2—2, Figure 1 looking in the direction of the arrows.
Figure 6:
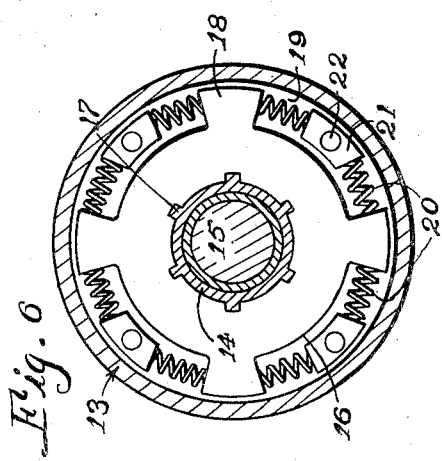

Figures 4 and 5 are views in section taken on the lines 4—4 and 5—5, Figure 1, showing the secondary and primary sun gears, used in the mechanism and illustrating the cooperating parts of the one-way clutch employed in connection therewith, and Figure 6 is a view in side elevation of the flexible connection between the driving shaft and the change speed mechanism of the transmission.

Referring now to the drawings in detail: 5 represents a housing constructed in any manner suitable for the purpose, preferably in the form of a modified drum structure having one side inclosed by a plate 6 bolted or otherwise secured in place at the meeting peripheral flanges 7. The plate 6 is made with an opening as at 8 through which the driving shaft 9 extends into the housing. The shaft being provided with an enlarged diameter 10 and an undercut annular recess 11 in the extremity thereof. The enlarged diameter 10 of the shaft provides a bearing surface which cooperates with a suitable packing 12 for sealing the opening 8 against escape of lubricating fluid contained in the housing. The annular recess 11 is made to accommodate a flexible connection 13 which is employed for resiliently connecting the driving shaft 9 with the relatively long sleeve 14 which is carried on the driven shaft 15.

As best illustrated in Figure 6 this flexible connection comprises a ring or the like member 16 which encircles the sleeve 14 and fixed to rotate therewith by means of a spline 17. The member 16 is made with radial projections 18 arranged in spaced relation to provide a series of spaces 19 each of which accommodate a pair of coil springs 20. One end of the springs bear against the radial projections 18 and the opposite ends of the springs are abutting against blocks 21 which are fixed in the recess 19 by means of rivets, pins or the like 22 which are in turn anchored or otherwise suitable attached in fixed relation to the enlarged diameter 10 of the driving shaft. The purpose of this flexible connection is to eliminate engine frequencies from the mechanism so as to establish an even drive in the mechanism at both forward and reverse speeds.

The driven shaft 15 enters the housing 5 from the side opposite the plate 6 and a ball bearing 23 is preferably employed to journal the shaft in the bearing mounting 24. The driven shaft extends through the housing and the extremity thereof is made with a reduced diameter 25 which is accommodated in an internal bore 26 in the end of the driving shaft 9, a roller bearing 27 being employed.

The sleeve 14 is made with a splined area 28 on which is mounted a primary sun gear 29 which is in constant mesh with a plurality of planet gears 30 which are journaled with freedom of rotation on the planet shafts 31 and these planet gears 30 are also in constant mesh with a ring gear 32 which is made with a collar or sleeve 33 and is mounted in fixed relation with the driven shaft 15. One end of the planet shafts 31 is splined or otherwise mounted in fixed relation as at 34 with a part 35 of a suitable planet carrier. The part 35 of the carrier having a sleeve 36 which is mounted on the driven shaft 15 and free to rotate thereto. The opposite ends 37 of the planet shafts 31 are splined or otherwise mounted in fixed relation to the plate part 38 of a combined planet carrier and ring gear 39. This combined planet carrier and ring gear 39 has a short sleeve portion 40 which is journaled on the sleeve 14 and free to rotate relative thereto. This construction completes the primary planetating system of the mechanism and it will be noted that the drive from the driving shaft is transmitted to the sleeve 14 through the flexible connection 13 then to the sun gear 29, then to the planet gears 30, into the ring gear 32.

Aside from the primary planetating system, the mechanism preferably includes at least two other planetating systems, namely, a secondary system and a supplemental system. Both of these systems are connected in driving relation with the primary system through means of the combined planet carrier and ring gear 39. In other words, the combined planet carrier and ring gear 39 serves as a planet carrier for the primary system and a ring gear for the secondary system. In this connection it is made with teeth which are in constant mesh with a series of secondary planet gears 41 which are journaled on the secondary planet shafts 42. The ends 43 of these secondary planet shafts 42 are splined or otherwise mounted in fixed relation with the planet carrier 44 on one side of the secondary and supplemental planetating systems and the opposite ends 45 of the shafts are splined or otherwise mounted in fixed relation with the carrier 46 on the opposite side of these two systems. Both the carriers 44 and 46 are made with sleeves 47 and 48 respectively, which are journaled on the sleeve 14. The secondary planet gears 41 are also in constant mesh with a secondary sun gear 49 which is splined as at 50 on the sleeve 14.

Since the primary and secondary sun gears 29 and 49, respectively, are thus fixed on the sleeve 14 and the sleeve 14 in turn fixed relatively to the driving shaft, the mechanism provides a double sun gear drive. In other words, the drive is taken into both the primary and secondary systems. In this connection it should be noted that the sun gears 29 and 49 as well as the planetating gears 30 and 41 are of different diameters and this is also true of the ring gear 32 and the combined ring gear and planet carrier 39. By means of these different diameters a required planetating motion is produced in the mechanism at speed ratios between the driving and driven shafts.

The supplemental planetating system is assembled adjacent the secondary system and the supplemental sun gear 51 is connected with the secondary sun gear 49 by means of a one-way clutch 52.

This one-way clutch mechanism is best illustrated in Figures 4 and 5 and it is to be noted that the secondary sun gear 49 is made with a plurality of spaced radial notches 53 which are made to receive a like number of projecting lugs 54 formed as an integral part of a disc ring member 55 arranged in fixed relation with the supplemental sun gear 51 within the circumference thereof. This member 55 is made with a series of spaced tangential surfaces 56 providing wedging spaces 57 in each of which is mounted a roller 58. The rollers are under the constant influence of spring plungers 59 which are carried in the radial lugs 60 formed as a part of the member 55. With this one-way clutch mechanism, the supplemental sun gear 51 is constrained to rotate with the secondary sun gear 49 in one direction but is free to rotate ahead of the secondary sun gear 49 in an opposite direction. The centrifugal responsive devices for automatically controlling the mechanism are directly associated with the supplemental system and the one-way clutch mechanism is intended to cooperate with the assembly in such a manner as to eliminate for all practical purposes the effectiveness of the inherent inertia forces of the centrifugal devices so that only the centrifugal or retarding forces developed as a result of the operation of the centrifugal devices will be effectively established in the mechanism. This principle of operation is one of the primary objects of the invention and will be further described as the description proceeds.

The supplemental sun gear 51 is mounted with freedom of rotation on the sleeve 14 and is in constant mesh with a series of supplemental planet gears 61 which are splined or otherwise fixed as at 62 on the supplemental planet shafts 63. These supplemental planet shafts are journaled as at 64 and 65 in the planet carriers 44 and 46. The ends of the shafts project beyond their journal mountings 64 and 65 and carry the centrifugal devices comprising the weights 66 and 67. These weights are splined or otherwise fixed as at 68 and 69 on the ends of the shafts 63. It should be noted that there are two sets of weights, one set on one side of the secondary and supplemental planetating systems and another set on the opposite side. So far as the present illustration is concerned there are three supplemental planet gears all of which being directly connected through the supplemental planet shafts 63 with the weights. There are also three secondary planetating gears.

By variations in the gear ratios various rates of rotation of the weighted shafts 63 may be realized. If the ratios of the primary and secondary systems were equalized, no rotation of the weighted shafts 63 would result; therefore the centrifugal forces developed would not be effective. With the arrangement shown, however, the rotation of the weights are reduced to a minimum without sacrificing their effectiveness for the purpose desired. The relatively slow rotation of the weights gives the over-running clutch 52 plenty of time to function which of course increases the efficiency of the automatic control.

For reversing the drive in the mechanism I preferably provide a suitable means for arresting the rotation of the combined ring gear and planet carrier 39. Convenient means for accomplishing this purpose as a result of a manual operation, comprises a brake band 70 which is made to encircle a braking surface 71 on the outer circumference of the combined ring gear and planet carrier 39. This brake band may be anchored to the casing 5 by a bolt or the like 72. The divided ends of the band on the diametrically opposite side of the braking surface are made with attaching ears 73 and 74 which cooperate with a rotatable rod 75 through the medium of a helical threaded engagement so that rotation of the rod 75 in one direction will draw the ears together and clamp the band around the braking surface and rotation of the rod in an opposite direction will spread the ears and provide a clearance between the brake band and the braking surface. The rod 75 may be manually manipulated through means of a lever arrangement conveniently accessible to the driver. One end of this lever arrangement will be keyed or otherwise fixed as at 76 to the rod 75 by means of a collar 77 on the end of a lever 78. A nut 79 on the threaded end 80 of the rod may be used to hold the collar in place.

Having thus described and shown an embodiment of my invention, what I claim and desire to secure by Letters Patent of the United States is:

1. In a transmission, driving and driven shafts, planetary change speed mechanism connecting said shafts, comprising primary and secondary planetating gear systems, a combined ring gear and planet carrier connecting said systems, a sun gear in each system, means for connecting said sun gears with the driving shaft, and centrifugal responsive means for automatically controlling said mechanism.

2. In a transmission, driving and driven shafts, planetary change speed mechanism connecting said shafts, comprising a plurality of planetating gear systems of variable gear ratios, sun gears in said systems, means for connecting said sun gears with the driving shaft and centrifugal responsive means associated with one of said systems for automatically controlling said mechanism, comprising eccentrically weighted planet shafts, planet gears on said shafts, said planet gears meshing with one of said sun gears and a one-way clutch connecting said sun gears.

3. In a transmission, driving and driven shafts, planetary change speed mechanism connecting said shafts, comprising a plurality of planetating gear systems of variable gear ratios and means for automatically controlling said mechanism, comprising eccentrically weighted planet shafts in one system, planet gears on said shafts, a sun gear meshing with said planet gears, a one-way clutch connecting said sun gear with a sun gear in an adjacent planetating system, planet gears meshing with said last named sun gear, a combined ring gear and planet carrier meshing with said last named planet gears and connecting the same with the next adjacent system, a ring gear in said next adjacent system connected in driving relation with the driven shaft, planet gears in said next adjacent system meshing with said last named ring gear, a sun gear in said last named system, and means for connecting all of said sun gears in driving relation with the driving shaft.

4. In a transmission, driving and driven shafts, change speed mechanism connecting said shafts, comprising a primary planetating gear system, a ring gear for said system connected in driving relation with the driven shaft, a sun gear in said system connected in driving relation with the driving shaft, a secondary planetating gear system, a combined ring gear and planet carrier connecting said secondary system with said primary system, a sun gear in said secondary system connected in driving relation with the driving shaft, a supplemental planetating system, a sun gear in said supplemental system, a one-way clutch connecting the sun gears of the secondary and supplemental systems, and means for automatically controlling said mechanism, comprising eccentrically weighted planet shafts and a planet carrier for said shafts having one part mounted one one side of the secondary and supplemental planetating systems, and another part mounted on the opposite side of said systems, the gears in said systems being of variable ratios.

5. The combination as set forth in claim 4 and in which means are provided for arresting the rotation of the combined ring gear and planet carrier for reversing the drive in said mechanism.

6. In a transmission, driving and driven shafts, and planetating change speed mechanism connecting said shafts, comprising a plurality of concentrically mounted planetating gear systems of variable gear ratios, a sun gear in each of said systems, means for connecting said sun gears in driving relation with the driving shaft and means for automatically controlling said mechanism, comprising centrifugal responsive means, a sun gear, in one of the said systems with which said centrifugal responsive means is operatively associated and a sun gear in an adjacent one of said systems, a one-way clutch connecting said gears and a combined planet carrier and ring gear connecting the next two adjacent systems.

7. The combination as set forth in claim 6 and in which means are proved for arresting the rotation of said combined ring gear and planet carrier for reversing the drive in said mechanism.

8. In a transmission, driving and driven shafts, planetary change speed mechanism connecting said shafts, comprising a plurality of concentrically mounted planetating gear systems of variable gear ratio, sun gears in each of said systems, means for connecting said sun gears with the driving shaft, means for connecting one of the systems with the driven shaft, a one-way clutch connecting two of the systems, a combined ring gear and planet carrier connecting two of the systems and means for automatically controlling the mechanism, comprising centrifugal responsive means, planet shafts on which said means are mounted, planet carriers for two of the systems for carrying said shafts and means for arresting the rotation of said combined ring gear and planet carrier for reversing the drive in the said mechanism.

9. In a transmission, driving and driven elements, means for connecting said elements in variable driving ratios and means for automatically changing the ratio, comprising in combination, a planetary gear system, a planet gear functioning as an element in said system, a centrifugal responsive mechanism for influencing the rotation of said planet gear about its own axis and means coacting with said centrifugal responsive mechanism for eliminating the effectiveness of the inherent inertia forces resulting from the operation of said centrifugal responsive mechanism.

10. In a transmission, driving and driven elements, means for connecting said elements in variable driving ratios and means for automatically changing the ratio, comprising in combination, a planetary gear system, a planet gear functioning as an element in said system, a centrifugal responsive mechanism for influencing the rotation of said planet gear about its own axis and means coacting with said centrifugal responsive mechanism for eliminating the effectiveness of the inherent inertia forces resulting from the operation of said centrifugal responsive mechanism and without sacrificing the effectiveness of the centrifugal forces as an influencing force for said planet gear.

11. In a transmission, driving and driven elements, means for connecting said elements in variable driving ratios and means for automatically changing the ratio, comprising in combination, a plurality of longitudinally aligned planetary gear trains, a planet gear functioning as an element in one of said gear trains and through which the drive is imparted from the driving element to the driven element, a carrier for said planet gear having an extension thereon, providing a ring gear for one of the other gear trains, means operatively associated with one of the gear trains for yieldably influencing the rotation of said planet gear about its own axis for automatically changing the driving ratio and means interconnecting said gear trains through which the effective control between said planet gear and the ratio changing means is transmitted.

12. In a transmission, driving and driven elements, means connecting said elements in variable driving ratios and means for automatically changing the ratio, comprising in combination, a plurality of longitudinally aligned and interconnected planetary gear trains, centrifugal weights coacting with certain of the gears in said gear trains for influencing the rotation of other of the gears about their own axis and means for reducing the effectiveness of the inertia forces developed by the operation of said weights without sacrificing the effectiveness of the centrifugal forces resulting from the operation thereof.

In testimony whereof I have hereunto subscribed my name.

KENNETH E. LYMAN.